(12) United States Patent
Lin et al.

(10) Patent No.: US 10,955,598 B2
(45) Date of Patent: Mar. 23, 2021

(54) OPTICAL DEVICES

(71) Applicant: VisEra Technologies Company Limited, Hsin-Chu (TW)

(72) Inventors: Kuo-Feng Lin, Kaohsiung (TW); Chin-Chuan Hsieh, Hsin-Chu (TW)

(73) Assignee: Visera Technologies Company Limited, Hsin-Chu (TW)

( * ) Notice: Subject to any disclaimer, the term of this patent is extended or adjusted under 35 U.S.C. 154(b) by 287 days.

(21) Appl. No.: 16/265,294

(22) Filed: Feb. 1, 2019

(65) Prior Publication Data

US 2020/0249382 A1 Aug. 6, 2020

(51) Int. Cl.
G02B 5/22 (2006.01)

(52) U.S. Cl.
CPC .................................. *G02B 5/223* (2013.01)

(58) Field of Classification Search
CPC ...................................................... G02B 5/223
USPC ............................................................ 359/891
See application file for complete search history.

(56) References Cited

U.S. PATENT DOCUMENTS

| | | | | |
|---|---|---|---|---|
| 4,029,394 A * | 6/1977 | Araki | ...................... | G02B 5/201 359/587 |
| 4,339,514 A * | 7/1982 | Biber | ..................... | G03F 7/0007 257/E31.121 |
| 4,355,866 A * | 10/1982 | Tanaka | .................. | H01J 29/898 359/586 |
| 5,874,188 A * | 2/1999 | Roberts | .................. | G02B 5/223 216/24 |
| 7,564,627 B2 * | 7/2009 | Heine-Kempkens | ........................ | G02B 5/201 359/582 |
| 8,559,113 B2 * | 10/2013 | Wehner | ............ | B29D 11/00634 359/589 |
| 8,779,484 B2 | 7/2014 | Shen et al. | | |
| 10,705,371 B2 * | 7/2020 | Minowa | ............ | G02F 1/133516 |

(Continued)

FOREIGN PATENT DOCUMENTS

| CN | 101211946 B | 12/2010 |
|---|---|---|
| CN | 108281435 A | 7/2018 |

(Continued)

OTHER PUBLICATIONS

Office Action issued in corresponding JP application No. 2019-143598 dated Sep. 15, 2020.

(Continued)

*Primary Examiner* — Collin X Beatty
(74) *Attorney, Agent, or Firm* — Muncy, Geissler, Olds & Lowe, P.C.

(57) ABSTRACT

An optical device is provided. The optical device includes a plurality of metal grids, a first patterned organic layer, and a second patterned organic layer. The first patterned organic layer includes a first portion having a first thickness, a second portion having a second thickness, a third portion having a third thickness, and a plurality of fourth portions. The first portion, the second portion and the third portion are respectively formed between the metal grids. The fourth portions are formed on the metal grids. The first thickness of the first portion is greater than the second thickness of the second portion. The second thickness of the second portion is greater than the third thickness of the third portion. The second patterned organic layer is formed on the fourth portions of the first patterned organic layer.

20 Claims, 6 Drawing Sheets

(56) References Cited

U.S. PATENT DOCUMENTS

| | | | | |
|---|---|---|---|---|
| 2009/0279174 A1* | 11/2009 | Miles | ............... | G02B 5/288 |
| | | | | 359/580 |
| 2012/0242939 A1* | 9/2012 | Li | ............... | G02F 1/13394 |
| | | | | 349/106 |
| 2013/0021688 A1* | 1/2013 | Wu | ............... | G02B 5/22 |
| | | | | 359/891 |
| 2014/0293469 A1* | 10/2014 | Yu | ............... | G02B 5/201 |
| | | | | 359/891 |
| 2016/0103361 A1* | 4/2016 | Wang | ............... | G02F 1/133516 |
| | | | | 359/891 |

FOREIGN PATENT DOCUMENTS

| | | |
|---|---|---|
| JP | 2011-77410 A | 4/2011 |
| JP | 2013-33864 A | 2/2013 |
| JP | 2014-225667 A | 12/2014 |
| TW | 201639138 A | 11/2016 |
| WO | WO2012/073402 A1 | 6/2012 |
| WO | WO2013/031537 A1 | 3/2013 |

OTHER PUBLICATIONS

Office Action (with the search report) issued in corresponding TW application No. 108136014 dated May 20, 2020.

* cited by examiner

OPTICAL DEVICES

BACKGROUND OF THE INVENTION

Field of the Invention

The invention relates to an optical device, and more particularly to an optical device with red, green, and blue color filters having different thickness or width thereamong.

Description of the Related Art

Optical devices include many structural types. In an optical device with a composite metal grid (CMG)-type structure, a microlens placed above the color filters is required. In an optical device with a wave guide color filter (WGCF)-type structure, instead of the microlens, a low-refractive-index material surrounding the color filters is used to form a wave guide structure.

However, in an optical device with a wave guide color filter (WGCF)-type structure, incident light is easily trapped in the color filters due to formation of the resonance (or coupling) effect between the guiding mode (GM) and the slab confinement mode (SCM) in the color filters, causing reduced sensitivity or quantum effect (QE) of the pixels.

Therefore, development of an optical device with a wave guide color filter (WGCF)-type structure capable of avoiding the resonance (or coupling) effect between the guiding mode (GM) and the slab confinement mode (SCM) in red, green, and blue color filters is desirable.

BRIEF SUMMARY OF THE INVENTION

In accordance with one embodiment of the invention, an optical device is provided. The optical device includes a plurality of metal grids, a first patterned organic layer, and a second patterned organic layer. The first patterned organic layer includes a first portion having a first thickness, a second portion having a second thickness, a third portion having a third thickness, and a plurality of fourth portions. The first portion, the second portion and the third portion are respectively formed between the metal grids. The fourth portions are formed on the metal grids. The first thickness of the first portion is greater than the second thickness of the second portion. The second thickness of the second portion is greater than the third thickness of the third portion. The second patterned organic layer is formed on the fourth portions of the first patterned organic layer.

In some embodiments, the first patterned organic layer has a refractive index which is in a range from about 1.2 to about 1.5. In some embodiments, the second patterned organic layer has a refractive index which is in a range from about 1.2 to about 1.5. In some embodiments, any one of the first thickness of the first portion, the second thickness of the second portion and the third thickness of the third portion of the first patterned organic layer is in a range from about 0.1 to about 0.5 um.

In some embodiments, the optical device further includes a plurality of color filters including a red color filter, a green color filter and a blue color filter. The red color filter includes a main portion formed on the first portion of the first patterned organic layer and surrounded by the second patterned organic layer. The green color filter includes a main portion formed on the second portion of the first patterned organic layer and surrounded by the second patterned organic layer. The blue color filter includes a main portion formed on the third portion of the first patterned organic layer and surrounded by the second patterned organic layer.

In some embodiments, the main portion of the red color filter has a thickness which is greater than that of the main portion of the green color filter. The thickness of the main portion of the green color filter is greater than that of the main portion of the blue color filter. In some embodiments, the thickness of the main portion of the blue color filter is greater than or equal to about 1 μm.

In some embodiments, the main portion of the red color filter has a width which is greater than that of the main portion of the green color filter. The width of the main portion of the green color filter is greater than that of the main portion of the blue color filter.

In some embodiments, the optical device further includes a plurality of protrusions formed on the first portion, the second portion and the third portion of the first patterned organic layer. The adjacent protrusions have a pitch therebetween. Each protrusion has a height. In some embodiments, the protrusions have a shape that is a pyramid, a pillar or a dome. In some embodiments, the pitch between the adjacent protrusions formed on the first portion is greater than that between the adjacent protrusions formed on the second portion. The pitch between the adjacent protrusions formed on the second portion is greater than that between the adjacent protrusions formed on the third portion. In some embodiments, the height of the protrusions formed on the first portion is greater than that of the protrusions formed on the second portion. The height of the protrusions formed on the second portion is greater than that of the protrusions formed on the third portion.

In some embodiments, the red color filter further includes an extending portion extending from the main portion of the red color filter, having a thickness and a width, formed in the first patterned organic layer. The green color filter further includes an extending portion extending from the main portion of the green color filter, having a thickness and a width, formed in the first patterned organic layer. The blue color filter further includes an extending portion extending from the main portion of the blue color filter, having a thickness and a width, formed in the first patterned organic layer. In some embodiments, the thickness of the extending portion of the red color filter is greater than that of the extending portion of the green color filter. The thickness of the extending portion of the green color filter is greater than that of the extending portion of the blue color filter. In some embodiments, the width of the extending portion of the red color filter is greater than that of the extending portion of the green color filter. The width of the extending portion of the green color filter is greater than that of the extending portion of the blue color filter.

In some embodiments, the width of the extending portion is less than that of the main portion of the red color filter. The width of the extending portion is less than that of the main of the green color filter. The width of the extending portion is less than that of the main portion of the blue color filter. In some embodiments, the optical device further includes a planarization layer formed on the second patterned organic layer and the color filters.

In the present invention, the thickness and width of the red, green, and blue color filters can be adjusted to avoid the resonance (or coupling) effect between the guiding mode (GM) and the slab confinement mode (SCM) in the red, green, and blue color filters. For example, the thickness of the red color filter is adjusted so that it is greater than that of the green color filter, and the thickness of the green color filter is adjusted so that it is greater than that of the blue color filter. It is also ensure that the relatively small thickness of the blue color filter is at least greater than or equal to about 1 μm. By changing the specific thickness of the red, green, and blue color filters during the design stage, the slab confinement mode (SCM) in the red, green, and blue color filters can be altered so that the resonance (or coupling) effect between the guiding mode (GM) and the slab confinement mode (SCM) in the red, green, and blue color filters is avoided. This facilitates light penetration and improves the sensitivity or quantum effect (QE) of the pixels.

Furthermore, the width of the red color filter is adjusted so that it is greater than that of the green color filter, and the width of the green color filter is adjusted so that it is greater than that of the blue color filter. Also, the relatively small width of the blue color filter is at least greater than or equal to a specific value. By changing the specific width of the red, green, and blue color filters during the design stage, the guiding mode (GM) in the red, green, and blue color filters can be altered, effectively eliminating the resonance (or coupling) effect between the guiding mode (GM) and the slab confinement mode (SCM) in the red, green, and blue color filters.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
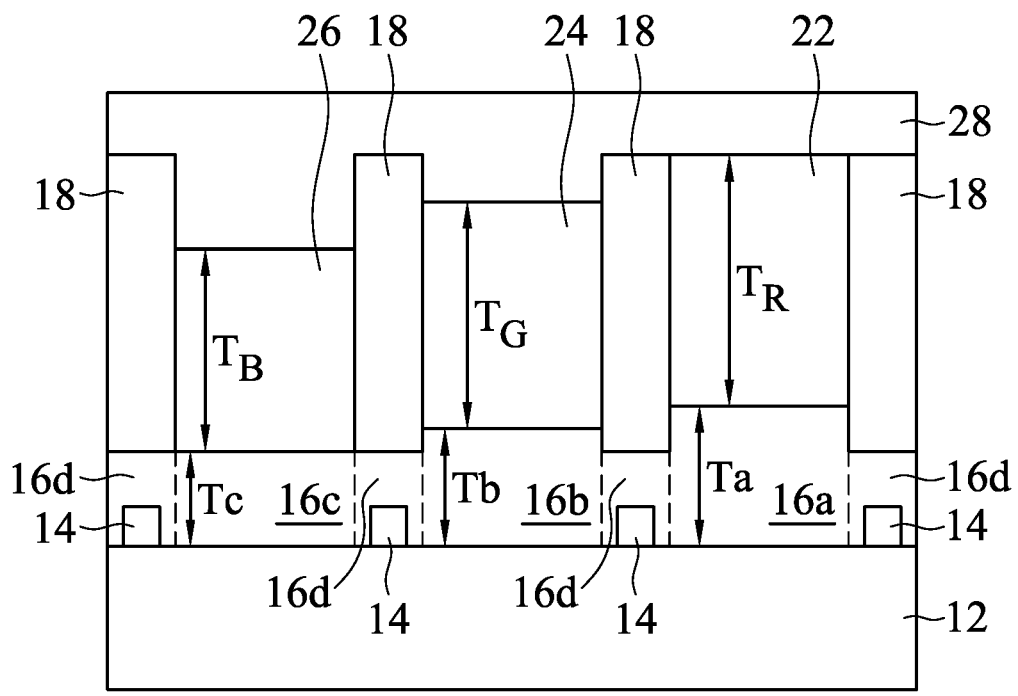
FIG. 1 is a cross-sectional view of an optical device in accordance with one embodiment of the invention.

Referring to FIG. 1, in accordance with one embodiment of the invention, an optical device 10 is provided herein. FIG. 1 shows a cross-sectional view of the optical device 10.

In FIG. 1, the optical device 10 includes a substrate 12, a plurality of metal grids 14, a first patterned organic layer 16, a second patterned organic layer 18 and a plurality of color filters 20. The metal grids 14 are formed on the substrate 12. The first patterned organic layer 16 includes a first portion 16a, a second portion 16b, a third portion 16c and a plurality of fourth portions 16d. The first portion 16a, the second portion 16b and the third portion 16c are respectively formed between the metal grids 14. The fourth portions 16d are formed on the metal grids 14. Specifically, the first thickness Ta of the first portion 16a is greater than the second thickness Tb of the second portion 16b. The second thickness Tb of the second portion 16b is greater than the third thickness Tc of the third portion 16c. The second patterned organic layer 18 is formed on the fourth portions 16d of the first patterned organic layer 16. The color filters 20 include a red color filter 22, a green color filter 24 and a blue color filter 26. The color filters 20 are formed on the first patterned organic layer 16 and surrounded by the second patterned organic layer 18. As shown in FIG. 1, the red color filter 22 is formed on the first portion 16a of the first patterned organic layer 16 and surrounded by the second patterned organic layer 18. The green color filter 24 is formed on the second portion 16b of the first patterned organic layer 16 and surrounded by the second patterned organic layer 18. The blue color filter 26 is formed on the third portion 16c of the first patterned organic layer 16 and surrounded by the second patterned organic layer 18.

In some embodiments, the substrate 12 is a silicon substrate and includes photoelectric conversion elements such as photodiodes. In some embodiments, the refractive index of the first patterned organic layer 16 is in a range from about 1.2 to about 1.5. In some embodiments, the refractive index of the second patterned organic layer 18 is in a range from about 1.2 to about 1.5. In some embodiments, the material of the first patterned organic layer 16 is the same as that of the second patterned organic layer 18. In some embodiments, any one of the first thickness Ta of the first portion 16a, the second thickness Tb of the second portion 16b and the third thickness Tc of the third portion 16c of the first patterned organic layer 16 is in a range from about 0.1 to about 0.5 um.

In FIG. 1, the thickness $T_R$ of the red color filter 22 formed on the first portion 16a of the first patterned organic layer 16 is greater than the thickness $T_G$ of the green color filter 24 formed on the second portion 16b of the first patterned organic layer 16. The thickness $T_G$ of the green color filter 24 formed on the second portion 16b of the first patterned organic layer 16 is greater than the thickness $T_B$ of the blue color filter 26 formed on the third portion 16c of the first patterned organic layer 16. In some embodiments, the thickness $T_B$ of the blue color filter 26 formed on the third portion 16c of the first patterned organic layer 16 is greater than or equal to about 1 μm.

In FIG. 1, the optical device 10 further includes a planarization layer 28 formed on the second patterned organic layer 18 and the color filters 20. In some embodiments, the planarization layer 28 includes a low-refractive-index material prepared by, for example, a CVD process.

According to the characteristics of light dispersion in the red, green, and blue color filters, the thickness $T_R$ of the red color filter 22 is adjusted so that it is greater than the thickness $T_G$ of the green color filter 24, and the thickness $T_G$ of the green color filter 24 is adjusted so that it is greater than the thickness $T_B$ of the blue color filter 26 (i.e. $T_R>T_G>T_B$). It is also ensure that the relatively small thickness $T_B$ of the blue color filter 26 is at least greater than or equal to about 1 μm. By changing the specific thickness of the red, green, and blue color filters in the design stage, the slab confinement mode (SCM) in the red, green, and blue color filters can be altered so that the resonance (or coupling) effect between the guiding mode (GM) and the slab confinement mode (SCM) in the red, green, and blue color filters is avoided. This facilitates light penetration and improves the sensitivity or quantum effect (QE) of the pixels.

The thickness of the first patterned organic layer 16 is designed to be in an optimal range, for example, the first thickness Ta of the first portion 16a is adjusted so that it is greater than the second thickness Tb of the second portion 16b, and the second thickness Tb of the second portion 16b is adjusted so that it is greater than the third thickness Tc of the third portion 16c (i.e. Ta>Tb>Tc). Also, any one of the first thickness Ta, the second thickness Tb and the third thickness Tc is in a range from about 0.1 to about 0.5 um. By the specific thickness design of the first patterned organic layer 16, the resonance (or coupling) effect between the guiding mode (GM) and the slab confinement mode (SCM) can be maintained in the first patterned organic layer 16 so that light is trapped in the first patterned organic layer 16 and then absorbed by the substrate 12, improving the sensitivity or quantum effect (QE) of the pixels.

Figure 2:
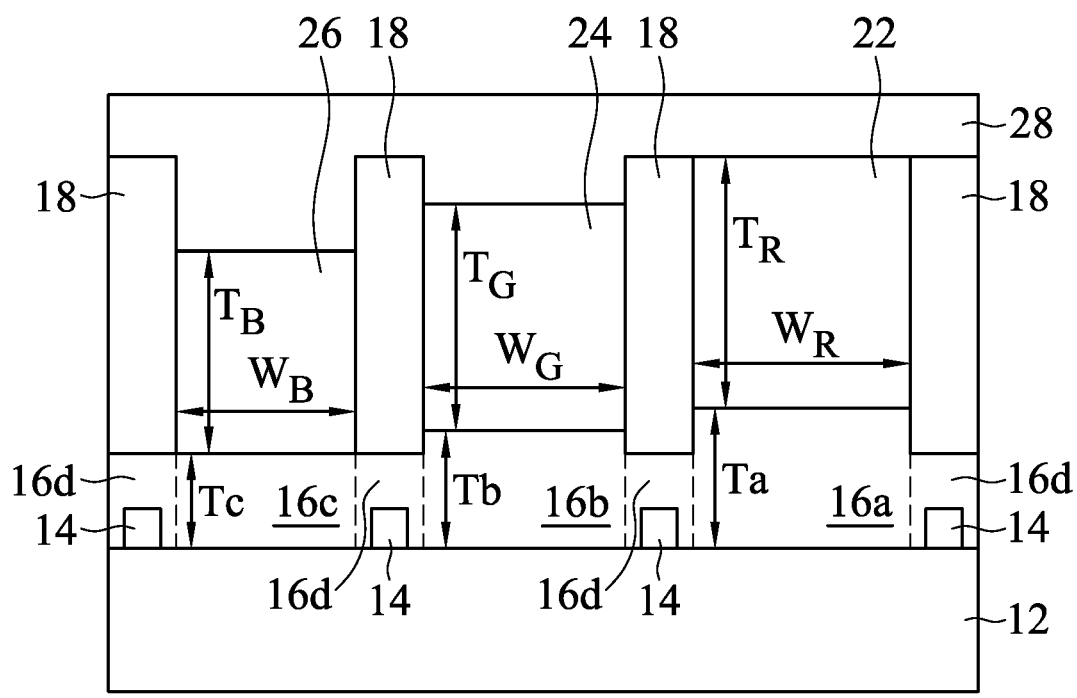
FIG. 2 is a cross-sectional view of an optical device in accordance with one embodiment of the invention.

Referring to FIG. 2, in accordance with one embodiment of the invention, an optical device 10 is provided herein. FIG. 2 shows a cross-sectional view of the optical device 10.

In FIG. 2, the optical device 10 includes a substrate 12, a plurality of metal grids 14, a first patterned organic layer 16, a second patterned organic layer 18 and a plurality of color filters 20. The metal grids 14 are formed on the substrate 12. The first patterned organic layer 16 includes a first portion 16a, a second portion 16b, a third portion 16c and a plurality of fourth portions 16d. The first portion 16a, the second portion 16b and the third portion 16c are respectively formed between the metal grids 14. The fourth portions 16d are formed on the metal grids 14. Specifically, the first thickness Ta of the first portion 16a is greater than the second thickness Tb of the second portion 16b. The second thickness Tb of the second portion 16b is greater than the third thickness Tc of the third portion 16c. The second patterned organic layer 18 is formed on the fourth portions 16d of the first patterned organic layer 16. The color filters 20 include a red color filter 22, a green color filter 24 and a blue color filter 26. The color filters 20 are formed on the first patterned organic layer 16 and surrounded by the second patterned organic layer 18. As shown in FIG. 2, the red color filter 22 is formed on the first portion 16a of the first patterned organic layer 16 and surrounded by the second patterned organic layer 18. The green color filter 24 is formed on the second portion 16b of the first patterned organic layer 16 and surrounded by the second patterned organic layer 18. The blue color filter 26 is formed on the third portion 16c of the first patterned organic layer 16 and surrounded by the second patterned organic layer 18.

In some embodiments, the substrate 12 is a silicon substrate and includes photoelectric conversion elements such as photodiodes. In some embodiments, the refractive index of the first patterned organic layer 16 is in a range from about 1.2 to about 1.5. In some embodiments, the refractive index of the second patterned organic layer 18 is in a range from about 1.2 to about 1.5. In some embodiments, the material of the first patterned organic layer 16 is the same as that of the second patterned organic layer 18. In some embodiments, any one of the first thickness Ta of the first portion 16a, the second thickness Tb of the second portion 16b and the third thickness Tc of the third portion 16c of the first patterned organic layer 16 is in a range from about 0.1 to about 0.5 um.

In FIG. 2, the thickness $T_R$ of the red color filter 22 formed on the first portion 16a of the first patterned organic layer 16 is greater than the thickness $T_G$ of the green color filter 24 formed on the second portion 16b of the first patterned organic layer 16. The thickness $T_G$ of the green color filter 24 formed on the second portion 16b of the first patterned organic layer 16 is greater than the thickness $T_B$ of the blue color filter 26 formed on the third portion 16c of the first patterned organic layer 16. In some embodiments, the thickness $T_B$ of the blue color filter 26 formed on the third portion 16c of the first patterned organic layer 16 is greater than or equal to about 1 μm.

In FIG. 2, the width $W_R$ of the red color filter 22 formed on the first portion 16a of the first patterned organic layer 16 is greater than the width $W_G$ of the green color filter 24 formed on the second portion 16b of the first patterned organic layer 16. The width $W_G$ of the green color filter 24 formed on the second portion 16b of the first patterned organic layer 16 is greater than the width $W_B$ of the blue color filter 26 formed on the third portion 16c of the first patterned organic layer 16. In some embodiments, the width $W_B$ of the blue color filter 26 formed on the third portion 16c of the first patterned organic layer 16 is greater than or equal to about 0.5 μm.

In FIG. 2, the optical device 10 further includes a planarization layer 28 formed on the second patterned organic layer 18 and the color filters 20. In some embodiments, the planarization layer 28 includes a low-refractive-index material prepared by, for example, a CVD process.

In FIG. 2, in addition to adjusting the specific thickness of the red, green, and blue color filters during the design phase, the width $W_R$ of the red color filter 22 may be adjusted so that it is greater than the width $W_G$ of the green color filter 24, and the width $W_G$ of the green color filter 24 may be adjusted so that it is greater than the width $W_B$ of the blue color filter 26 (i.e. $W_R>W_G>W_B$). The relatively small width $W_B$ of the blue color filter 26 is at least greater than or equal to about 0.5 μm. By changing the specific width of the red, green, and blue color filters during the design stage, the guiding mode (GM) in the red, green, and blue color filters can be altered so that the resonance (or coupling) effect between the guiding mode (GM) and the slab confinement mode (SCM) in the red, green, and blue color filters is inhibited further. This facilitates light penetration and improves the sensitivity or quantum effect (QE) of the pixels.

Figure 3:
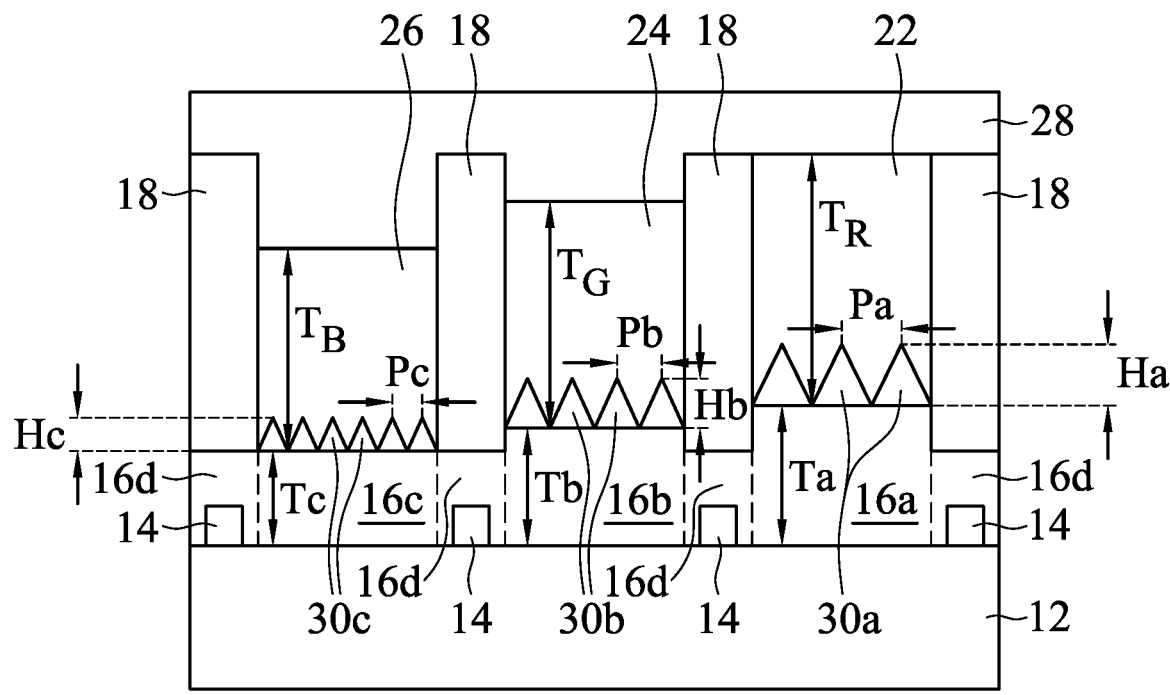
FIG. 3 is a cross-sectional view of an optical device in accordance with one embodiment of the invention.

Referring to FIG. 3, in accordance with one embodiment of the invention, an optical device 10 is provided herein. FIG. 3 shows a cross-sectional view of the optical device 10.

In FIG. 3, the optical device 10 includes a substrate 12, a plurality of metal grids 14, a first patterned organic layer 16, a second patterned organic layer 18 and a plurality of color filters 20. The metal grids 14 are formed on the substrate 12. The first patterned organic layer 16 includes a first portion 16a, a second portion 16b, a third portion 16c and a plurality of fourth portions 16d. The first portion 16a, the second portion 16b and the third portion 16c are respectively formed between the metal grids 14. The fourth portions 16d are formed on the metal grids 14. Specifically, the first thickness Ta of the first portion 16a is greater than the second thickness Tb of the second portion 16b. The second thickness Tb of the second portion 16b is greater than the third thickness Tc of the third portion 16c. The second patterned organic layer 18 is formed on the fourth portions 16d of the first patterned organic layer 16. The color filters 20 include a red color filter 22, a green color filter 24 and a blue color filter 26. The color filters 20 are formed on the first patterned organic layer 16 and surrounded by the second patterned organic layer 18. As shown in FIG. 3, the red color filter 22 is formed on the first portion 16a of the first patterned organic layer 16 and surrounded by the second patterned organic layer 18. The green color filter 24 is formed on the second portion 16b of the first patterned organic layer 16 and surrounded by the second patterned organic layer 18. The blue color filter 26 is formed on the third portion 16c of the first patterned organic layer 16 and surrounded by the second patterned organic layer 18.

In some embodiments, the substrate 12 is a silicon substrate and includes photoelectric conversion elements such as photodiodes. In some embodiments, the refractive index of the first patterned organic layer 16 is in a range from about 1.2 to about 1.5. In some embodiments, the refractive index of the second patterned organic layer 18 is in a range from about 1.2 to about 1.5. In some embodiments, the material of the first patterned organic layer 16 is the same as that of the second patterned organic layer 18. In some embodiments, any one of the first thickness Ta of the first portion 16a, the second thickness Tb of the second portion 16b and the third thickness Tc of the third portion 16c of the first patterned organic layer 16 is in a range from about 0.1 to about 0.5 um.

In FIG. 3, the thickness $T_R$ of the red color filter 22 formed on the first portion 16a of the first patterned organic layer 16 is greater than the thickness $T_G$ of the green color filter 24 formed on the second portion 16b of the first patterned organic layer 16. The thickness $T_G$ of the green color filter 24 formed on the second portion 16b of the first patterned organic layer 16 is greater than the thickness $T_B$ of the blue color filter 26 formed on the third portion 16c of the first patterned organic layer 16. In some embodiments, the thickness $T_B$ of the blue color filter 26 formed on the third portion 16c of the first patterned organic layer 16 is greater than or equal to about 1 μm.

In FIG. 3, the optical device 10 further includes a plurality of protrusions 30 including first protrusions 30a, second protrusions 30b and third protrusions 30c respectively formed on the first portion 16a, the second portion 16b and the third portion 16c of the first patterned organic layer 16. The adjacent protrusions have a pitch therebetween. Each protrusion has a height. As shown in FIG. 3, the first protrusions 30a are formed on the first portion 16a of the first patterned organic layer 16. The second protrusions 30b are formed on the second portion 16b of the first patterned organic layer 16. The third protrusions 30c are formed on the third portion 16c of the first patterned organic layer 16.

In FIG. 3, the shape of the first protrusions 30a, the second protrusions 30b and the third protrusions 30c is a pyramid. In some embodiments, the first protrusions 30a, the second protrusions 30b and the third protrusions 30c include other suitable shapes such as a pillar or a dome. Specifically, the first pitch Pa between the adjacent first protrusions 30a formed on the first portion 16a of the first patterned organic layer 16 is greater than the second pitch Pb between the adjacent second protrusions 30b formed on the second portion 16b of the first patterned organic layer 16. The second pitch Pb between the adjacent second protrusions 30b formed on the second portion 16b of the first patterned organic layer 16 is greater than the third pitch Pc between the adjacent third protrusions 30c formed on the third portion 16c of the first patterned organic layer 16. Furthermore, the first height Ha of the first protrusions 30a formed on the first portion 16a of the first patterned organic layer 16 is greater than the second height Hb of the second protrusions 30b formed on the second portion 16b of the first patterned organic layer 16. The second height Hb of the second protrusions 30b formed on the second portion 16b of the first patterned organic layer 16 is greater than the third height Hc of the third protrusions 30c formed on the third portion 16c of the first patterned organic layer 16.

In FIG. 3, the optical device 10 further includes a planarization layer 28 formed on the second patterned organic layer 18 and the color filters 20. In some embodiments, the planarization layer 28 includes a low-refractive-index material prepared by, for example, a CVD process.

The first protrusions 30a, the second protrusions 30b and the third protrusions 30c respectively formed on the first portion 16a, the second portion 16b and the third portion 16c of the first patterned organic layer 16 provide a gradient-refractive-index region between the color filters 20 and the first patterned organic layer 16, facilitating light penetration.

Figure 4:
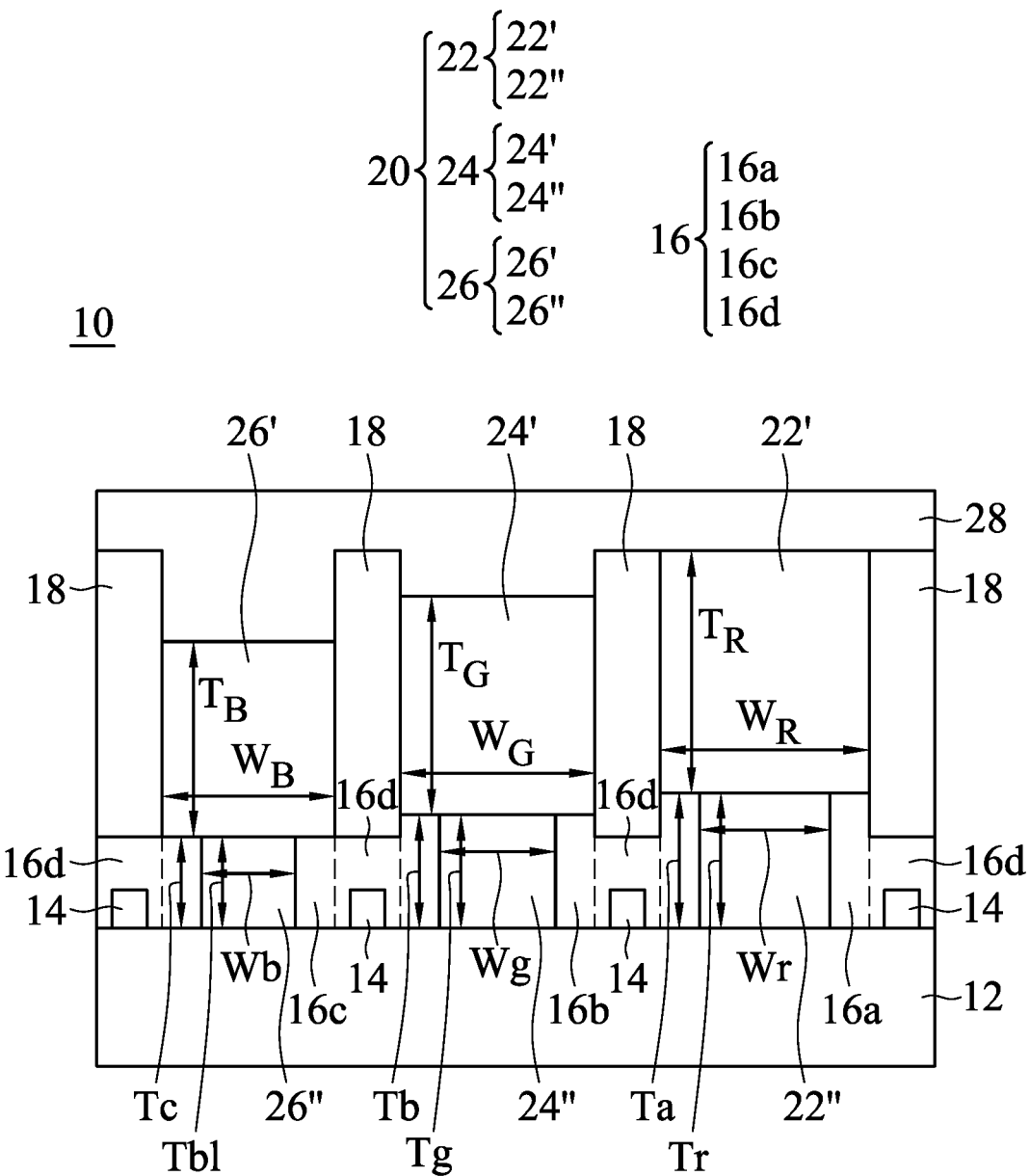
FIG. 4 is a cross-sectional view of an optical device in accordance with one embodiment of the invention

Referring to FIG. 4, in accordance with one embodiment of the invention, an optical device 10 is provided herein. FIG. 4 shows a cross-sectional view of the optical device 10.

In FIG. 4, the optical device 10 includes a substrate 12, a plurality of metal grids 14, a first patterned organic layer 16, a second patterned organic layer 18 and a plurality of color filters 20. The metal grids 14 are formed on the substrate 12. The first patterned organic layer 16 includes a first portion 16a, a second portion 16b, a third portion 16c and a plurality of fourth portions 16d. The first portion 16a, the second portion 16b and the third portion 16c are respectively formed between the metal grids 14. The fourth portions 16d are formed on the metal grids 14. Specifically, the first thickness Ta of the first portion 16a is greater than the second thickness Tb of the second portion 16b. The second thickness Tb of the second portion 16b is greater than the third thickness Tc of the third portion 16c. The second patterned organic layer 18 is formed on the fourth portions 16d of the first patterned organic layer 16. The color filters 20 include a red color filter 22, a green color filter 24 and a blue color filter 26. The red color filter 22 includes a main portion 22' and an extending portion 22" extending from the main portion 22'. The green color filter 24 includes a main portion 24' and an extending portion 24" extending from the main portion 24'. The blue color filter 26 includes a main portion 26' and an extending portion 26" extending from the main portion 26'. As shown in FIG. 4, the main portion 22' of the red color filter 22 is formed on the first portion 16a of the first patterned organic layer 16 and surrounded by the second patterned organic layer 18. The main portion 24' of the green color filter 24 is formed on the second portion 16b of the first patterned organic layer 16 and surrounded by the second patterned organic layer 18. The main portion 26' of the blue color filter 26 is formed on the third portion 16c of the first patterned organic layer 16 and surrounded by the second patterned organic layer 18.

In some embodiments, the substrate 12 is a silicon substrate and includes photoelectric conversion elements such as photodiodes. In some embodiments, the refractive index of the first patterned organic layer 16 is in a range from about 1.2 to about 1.5. In some embodiments, the refractive index of the second patterned organic layer 18 is in a range from about 1.2 to about 1.5. In some embodiments, the material of the first patterned organic layer 16 is the same as that of the second patterned organic layer 18. In some embodiments, any one of the first thickness Ta of the first portion 16a, the second thickness Tb of the second portion 16b and the third thickness Tc of the third portion 16c of the first patterned organic layer 16 is in a range from about 0.1 to about 0.5 um.

In FIG. 4, the thickness $T_R$ of the main portion 22' of the red color filter 22 formed on the first portion 16a of the first patterned organic layer 16 is greater than the thickness $T_G$ of the main portion 24' of the green color filter 24 formed on the second portion 16b of the first patterned organic layer 16. The thickness $T_G$ of the main portion 24' of the green color filter 24 formed on the second portion 16b of the first patterned organic layer 16 is greater than the thickness $T_B$ of the main portion 26' of the blue color filter 26 formed on the third portion 16c of the first patterned organic layer 16. In some embodiments, the thickness $T_B$ of the main portion 26' of the blue color filter 26 formed on the third portion 16c of the first patterned organic layer 16 is greater than or equal to about 1 µm.

In FIG. 4, the width $W_R$ of the main portion 22' of the red color filter 22 formed on the first portion 16a of the first patterned organic layer 16 is greater than the width $W_G$ of the main portion 24' of the green color filter 24 formed on the second portion 16b of the first patterned organic layer 16. The width $W_G$ of the main portion 24' of the green color filter 24 formed on the second portion 16b of the first patterned organic layer 16 is greater than the width $W_B$ of the main portion 26' of the blue color filter 26 formed on the third portion 16c of the first patterned organic layer 16. In some embodiments, the width $W_B$ of the main portion 26' of the blue color filter 26 formed on the third portion 16c of the first patterned organic layer 16 is greater than or equal to about 0.5 µm.

In FIG. 4, the extending portion 22" of the red color filter 22 is formed in the first portion 16a of the first patterned organic layer 16 and in contact with the substrate 12 and the main portion 22' of the red color filter 22. The extending portion 24" of the green color filter 24 is formed in the second portion 16b of the first patterned organic layer 16 and in contact with the substrate 12 and the main portion 24' of the green color filter 24. The extending portion 26" of the blue color filter 26 is formed in the third portion 16c of the first patterned organic layer 16 and in contact with the substrate 12 and the main portion 26' of the blue color filter 26.

In FIG. 4, the thickness Tr of the extending portion 22" of the red color filter 22 formed in the first portion 16a of the first patterned organic layer 16 is greater than the thickness Tg of the extending portion 24" of the green color filter 24 formed in the second portion 16b of the first patterned organic layer 16. The thickness Tg of the extending portion 24" of the green color filter 24 formed in the second portion 16b of the first patterned organic layer 16 is greater than the thickness Tbl of the extending portion 26" of the blue color filter 26 formed in the third portion 16c of the first patterned organic layer 16. In some embodiments, the thickness Tbl of the extending portion 26" of the blue color filter 26 formed in the third portion 16c of the first patterned organic layer 16 is greater than or equal to about 0.2 µm.

In FIG. 4, the width Wr of the extending portion 22" of the red color filter 22 formed in the first portion 16a of the first patterned organic layer 16 is greater than the width Wg of the extending portion 24" of the green color filter 24 formed in the second portion 16b of the first patterned organic layer 16. The width Wg of the extending portion 24" of the green color filter 24 formed in the second portion 16b of the first patterned organic layer 16 is greater than the width Wb of the extending portion 26" of the blue color filter 26 formed in the third portion 16c of the first patterned organic layer 16. In some embodiments, the width Wb of the extending portion 26" of the blue color filter 26 formed in the third portion 16c of the first patterned organic layer 16 is greater than or equal to about 0.3 µm.

In FIG. 4, the width Wr of the extending portion 22" of the red color filter 22 formed in the first portion 16a of the first patterned organic layer 16 is less than the width $W_R$ of the main portion 22' of the red color filter 22 formed on the first portion 16a of the first patterned organic layer 16. The width Wg of the extending portion 24" of the green color filter 24 formed in the second portion 16b of the first patterned organic layer 16 is less than the width $W_G$ of the main portion 24' of the green color filter 24 formed on the second portion 16b of the first patterned organic layer 16. The width Wb of the extending portion 26" of the blue color filter 26 formed in the third portion 16c of the first patterned organic layer 16 is less than the width $W_B$ of the main portion 26' of the blue color filter 26 formed on the third portion 16c of the first patterned organic layer 16.

In FIG. 4, the optical device 10 further includes a planarization layer 28 formed on the second patterned organic layer 18 and the color filters 20. In some embodiments, the planarization layer 28 includes a low-refractive-index material prepared by, for example, a CVD process.

In FIG. 4, in addition being able to change the designed thickness and width of the main portions of the red, green, and blue color filters, which are formed on the first patterned organic layer, the thickness Tr and the width Wr of the extending portion 22" of the red color filter 22 can also be adjusted so that it is greater than the thickness Tg and the width Wg of the extending portion 24" of the green color filter 24. The thickness Tg and the width Wg of the extending portion 24" of the green color filter 24 can be adjusted so that it is greater than the thickness Tbl and the width Wb of the extending portion 26" of the blue color filter 26 (i.e. Tr>Tg>Tbl and Wr>Wg>Wb). The relatively small thickness Tbl of the extending portion 26" of the blue color filter 26 is at least greater than or equal to about 0.2 µm. The relatively small width Wb of the extending portion 26" of the blue color filter 26 is at least greater than or equal to about 0.3 µm. Similarly, by changing the specific thickness and width of the extending portions of the red, green, blue color filters formed in the first patterned organic layer during the design stage, the resonance (or coupling) effect between the guiding mode (GM) and the slab confinement mode (SCM) in the red, green, and blue color filters can be inhibited even further. This facilitates light penetration and improves the sensitivity or quantum effect (QE) of the pixels.

Example 1

Figure 5:
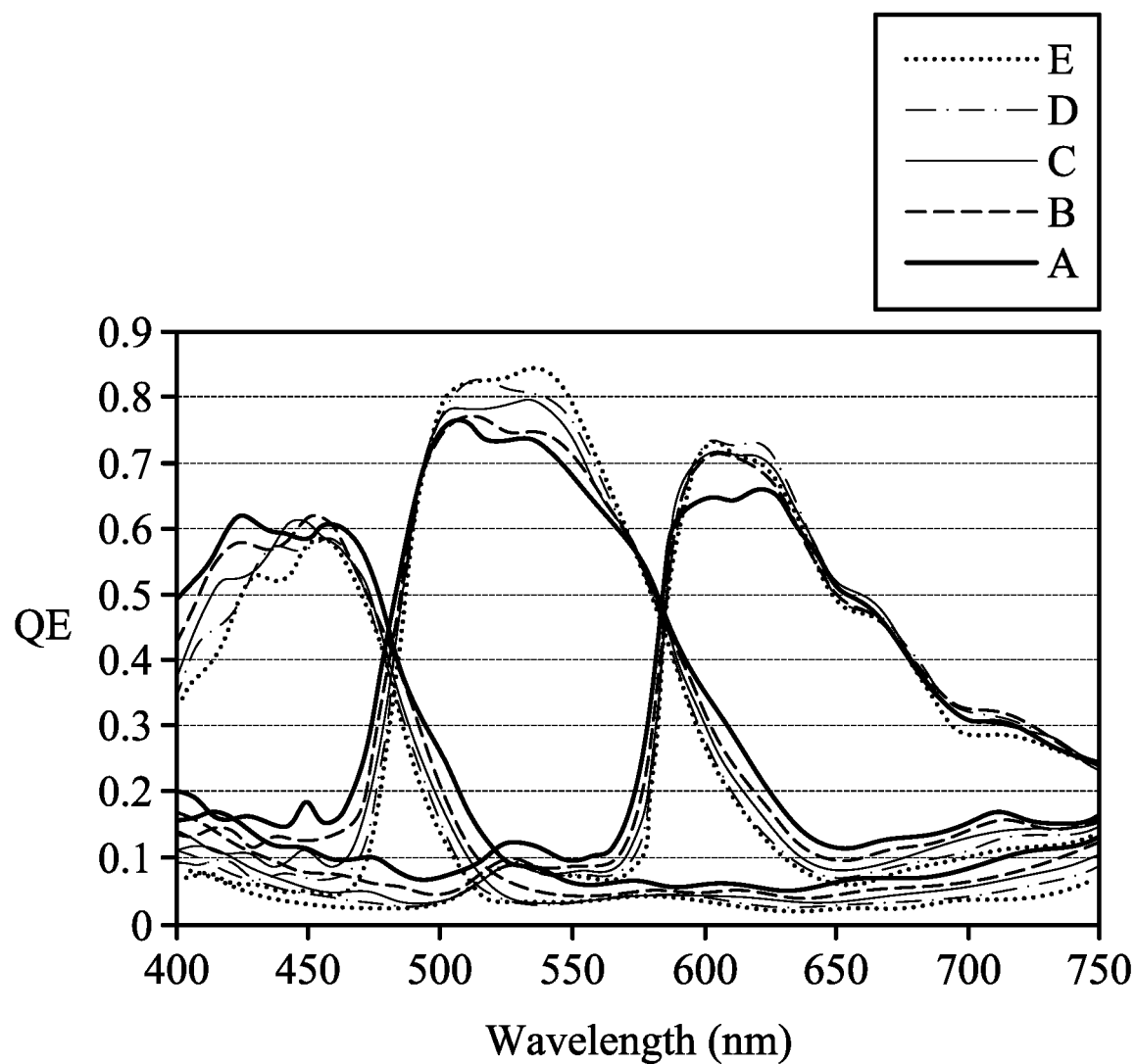
FIG. 5 shows various QE spectrums of the optical devices in accordance with one embodiment of the invention.

QE Spectrum Improvement of the Optical Device with the Thickness-Increased Color Filters In this example, QE improvement is acknowledged by increasing the thickness of the red, green, and blue color filters of the optical device. Referring to FIG. 5, the curve "A" shows the QE spectrum of the optical device with the red, green, and blue color filters having a thickness of about 600 nm. The curve "B" shows the QE spectrum of the optical device with the red, green, and blue color filters having a thickness of about 700 nm. The curve "C" shows the QE spectrum of the optical device with the red, green, and blue color filters having a thickness of about 800 nm. The curve "D" shows the QE spectrum of the optical device with the red, green, and blue color filters having a thickness of about 900 nm. The curve "E" shows the QE spectrum of the optical device with the red, green, and blue color filters having a thickness of about 1,000 nm.

The QE spectrum (the curve "E") built by the present optical device that includes the red, green, and blue color filters having a thickness of about 1,000 nm shows that the QE peak of the red (R) color filter is a significant improvement of about 10% over that in the curve "A" due to the elimination of the resonance (or coupling) effect between the guiding mode (GM) and the slab confinement mode (SCM) in the red, green, and blue color filters. Also, the QE peak of the green (G) color filter is a significant improvement of about 10% over that in the curve "A". In addition, the QE spectrum (the curve "E") also shows that the low cross-talk between the color filters is maintained.

Example 2

Figure 6:
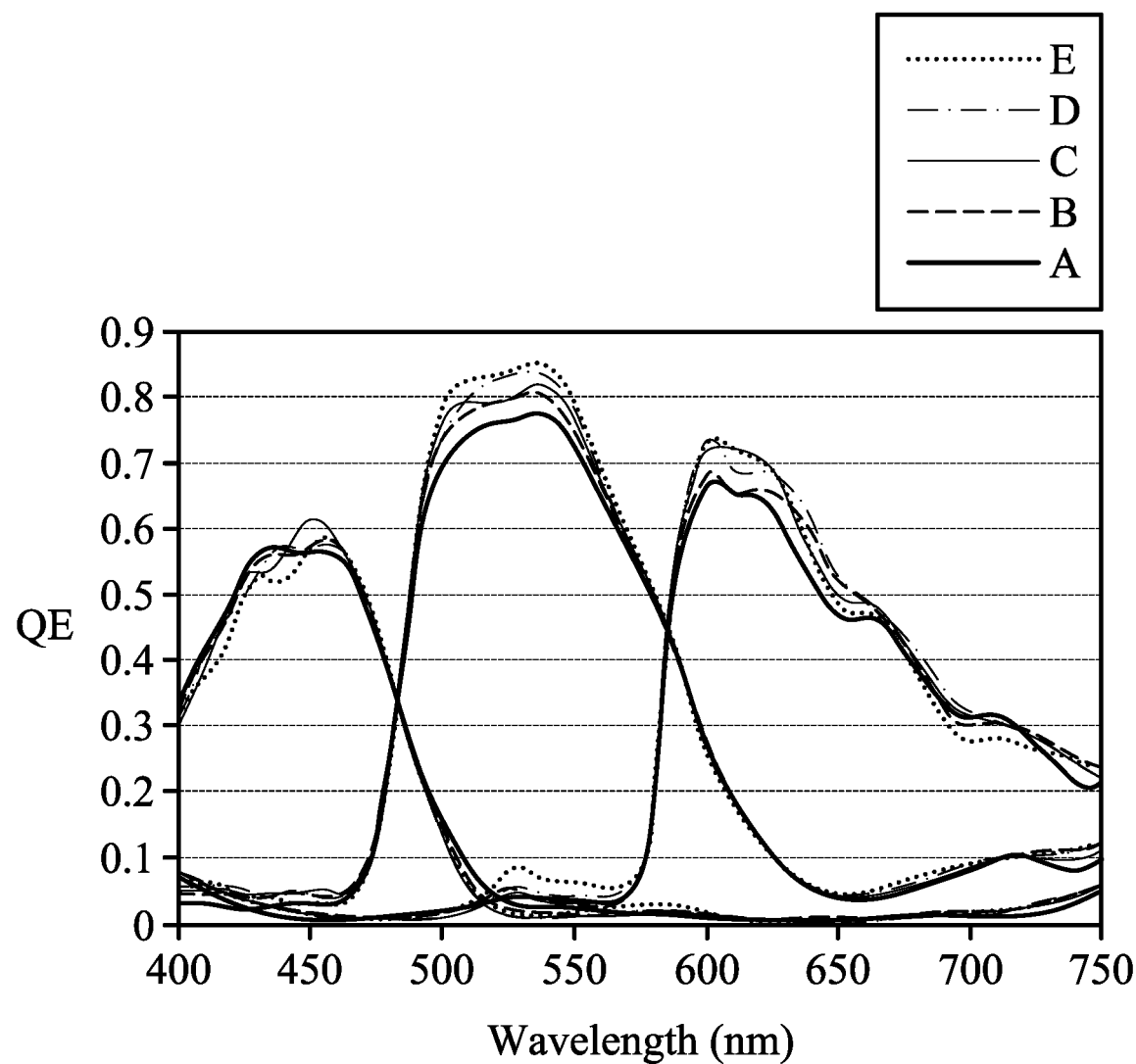
FIG. 6 shows various QE spectrums of the optical devices in accordance with one embodiment of the invention.

QE Spectrum Improvement of the Optical Device with the Thickness-Increased Organic Layer Below the Color Filters In this example, QE improvement is acknowledged by increasing the thickness of the organic layer below the red, green, and blue color filters of the optical device. Referring to FIG. 6, the curve "A" shows the QE spectrum of the optical device with the organic layer below the red, green, and blue color filters, and the thickness of the organic layer is lower than that of the metal grids. The curve "B" shows the QE spectrum of the optical device with the organic layer below the red, green, and blue color filters, and the thickness of the organic layer is equal to that of the metal grids. The curve "C" shows the QE spectrum of the optical device with the organic layer below the red, green, and blue color filters, and the thickness of the organic layer is greater than that of the metal grids by about 100 nm. The curve "D" shows the QE spectrum of the optical device with the organic layer below the red, green, and blue color filters, and the thickness of the organic layer is greater than that of the metal grids by about 200 nm. The curve "E" shows the QE spectrum of the optical device with the organic layer below the red, green, and blue color filters, and the thickness of the organic layer is greater than that of the metal grids by about 300 nm.

The QE spectrum (the curve "E") built by the present optical device that includes an organic layer (with a thickness greater than that of the metal grids by about 300 nm) below the red, green, and blue color filters shows that the QE peak of the red (R) color filter is a significant improvement of about 10% over that in the curve "A" due to maintenance of the resonance (or coupling) effect between the guiding mode (GM) and the slab confinement mode (SCM) in the organic layer below the red, green, and blue color filters. Also, the QE peak of the green (G) color filter is a significant improvement of about 10% over that in the curve "A". In addition, the QE spectrum (the curve "E") also shows that the low cross-talk between the color filters is maintained.

In the present invention, the thickness and width of the red, green, and blue color filters can be adjusted to avoid the resonance (or coupling) effect between the guiding mode (GM) and the slab confinement mode (SCM) in the red, green, and blue color filters. For example, the thickness of the red color filter is adjusted so that it is greater than that of the green color filter, and the thickness of the green color filter is adjusted so that it is greater than that of the blue color filter. It is also ensure that the relatively small thickness of the blue color filter is at least greater than or equal to about 1 µm. By adjusting the specific thickness of the red, green, and blue color filters in the design stage, the slab confinement mode (SCM) in the red, green, and blue color filters can be altered so that the resonance (or coupling) effect between the guiding mode (GM) and the slab confinement mode (SCM) in the red, green, and blue color filters is avoided. This facilitates light penetration and improves the sensitivity or quantum effect (QE) of the pixels.

Furthermore, the width of the red color filter is adjusted so that it is greater than that of the green color filter, and the width of the green color filter is adjusted so that it is greater than that of the blue color filter. Also, the relatively small width of the blue color filter is at least greater than or equal to a specific value. By changing the specific width of the red, green, and blue color filters at the design stage, the guiding mode (GM) in the red, green, and blue color filters can be altered, effectively eliminating the resonance (or coupling) effect between the guiding mode (GM) and the slab confinement mode (SCM) in the red, green, and blue color filters.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
   a plurality of metal grids;
   a first patterned organic layer comprising a first portion having a first thickness, a second portion having a second thickness, a third portion having a third thickness, and a plurality of fourth portions, wherein the first portion, the second portion and the third portion are respectively formed between the metal grids, and the fourth portions are formed on the metal grids, wherein the first thickness of the first portion is greater than the second thickness of the second portion, and the second thickness of the second portion is greater than the third thickness of the third portion; and
   a second patterned organic layer formed on the fourth portions of the first patterned organic layer.

2. The optical device as claimed in claim 1, wherein the first patterned organic layer has a refractive index which is in a range from about 1.2 to about 1.5.

3. The optical device as claimed in claim 1, wherein the second patterned organic layer has a refractive index which is in a range from about 1.2 to about 1.5.

4. The optical device as claimed in claim 1, wherein any one of the first thickness of the first portion, the second thickness of the second portion and the third thickness of the third portion of the first patterned organic layer is in a range from about 0.1 um to about 0.5 um.

5. The optical device as claimed in claim 1, further comprising a plurality of color filters comprising a red color filter, a green color filter and a blue color filter, wherein the red color filter comprises a main portion formed on the first portion of the first patterned organic layer and surrounded by the second patterned organic layer, the green color filter comprises a main portion formed on the second portion of the first patterned organic layer and surrounded by the second patterned organic layer, and the blue color filter comprises a main portion formed on the third portion of the first patterned organic layer and surrounded by the second patterned organic layer.

6. The optical device as claimed in claim 5, wherein the main portion of the red color filter has a thickness which is greater than that of the main portion of the green color filter, and the thickness of the main portion of the green color filter is greater than that of the main portion of the blue color filter.

7. The optical device as claimed in claim 6, wherein the thickness of the main portion of the blue color filter is greater than or equal to 1 µm.

8. The optical device as claimed in claim 5, wherein the main portion of the red color filter has a width which is greater than that of the main portion of the green color filter, and the width of the main portion of the green color filter is greater than that of the main portion of the blue color filter.

9. The optical device as claimed in claim 5, further comprising a plurality of protrusions formed on the first portion, the second portion and the third portion of the first patterned organic layer, wherein the adjacent protrusions have a pitch therebetween, each protrusion has a height, and the protrusions have a shape that is a pyramid, a pillar or a dome.

10. The optical device as claimed in claim 9, wherein the pitch between the adjacent protrusions formed on the first portion is greater than that between the adjacent protrusions formed on the second portion, and the pitch between the adjacent protrusions formed on the second portion is greater than that between the adjacent protrusions formed on the third portion.

11. The optical device as claimed in claim 9, wherein the height of the protrusions formed on the first portion is greater than that of the protrusions formed on the second portion, and the height of the protrusions formed on the second portion is greater than that of the protrusions formed on the third portion.

12. The optical device as claimed in claim 8, wherein the red color filter further comprises an extending portion extending from the main portion of the red color filter, having a thickness and a width, formed in the first patterned organic layer.

13. The optical device as claimed in claim 12, wherein the green color filter further comprises an extending portion extending from the main portion of the green color filter, having a thickness and a width, formed in the first patterned organic layer.

14. The optical device as claimed in claim 13, wherein the blue color filter further comprises an extending portion extending from the main portion of the blue color filter, having a thickness and a width, formed in the first patterned organic layer.

15. The optical device as claimed in claim 14, wherein the thickness of the extending portion of the red color filter is greater than that of the extending portion of the green color filter, and the thickness of the extending portion of the green color filter is greater than that of the extending portion of the blue color filter.

16. The optical device as claimed in claim 15, wherein the width of the extending portion of the red color filter is greater than that of the extending portion of the green color filter, and the width of the extending portion of the green color filter is greater than that of the extending portion of the blue color filter.

17. The optical device as claimed in claim 16, wherein the width of the extending portion is less than that of the main portion of the red color filter.

18. The optical device as claimed in claim 16, wherein the width of the extending portion is less than that of the main portion of the green color filter.

19. The optical device as claimed in claim 16, wherein the width of the extending portion is less than that of the main portion of the blue color filter.

20. The optical device as claimed in claim 5, further comprising a planarization layer formed on the second patterned organic layer and the color filters.

* * * * *